G. H. WATERHOUSE.
NOZZLE FOR VACUUM COTTON PICKING MACHINES.
APPLICATION FILED SEPT. 26, 1916. RENEWED AUG. 28, 1918.
1,286,165.
Patented Nov. 26, 1918.
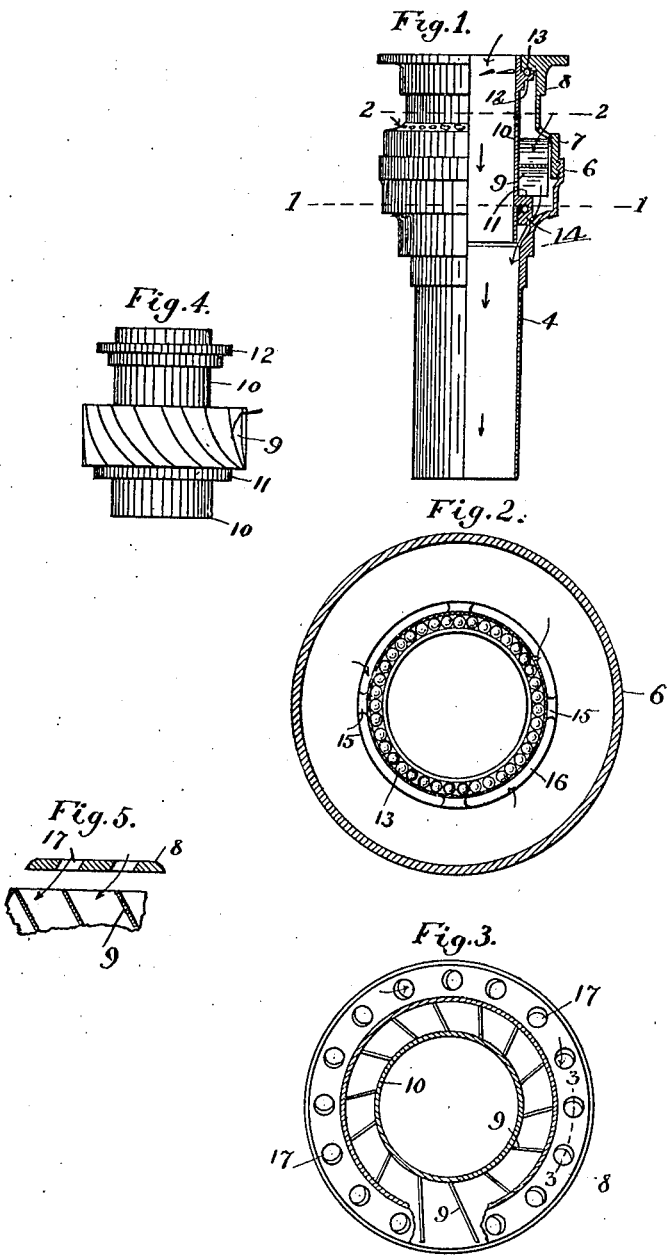
Inventor:
George H. Waterhouse
by S. W. Bates.
Atty.

UNITED STATES PATENT OFFICE.

GEORGE H. WATERHOUSE, OF WESTBROOK, MAINE, ASSIGNOR TO WOODBURY K. DANA, OF WESTBROOK, MAINE.

NOZZLE FOR VACUUM COTTON-PICKING MACHINES.

1,286,165.  Specification of Letters Patent.  Patented Nov. 26, 1918.

Application filed September 26, 1916, Serial No. 122,292. Renewed August 28, 1918. Serial No. 251,836.

*To all whom it may concern:*

Be it known that I, GEORGE H. WATERHOUSE, a citizen of the United States, residing at Westbrook, in the county of Cumberland and State of Maine, have invented certain new and useful Improvements in Nozzles for Vacuum Cotton-Picking Machines, of which the following is a specification.

My invention relates to nozzles for vacuum cotton picking machines where the nozzle is connected with a vacuum tube for drawing the cotton into the nozzle from the cotton boll.

Such nozzles are frequently provided with rotating picking tubes having pins at the outer end, whereby the cotton fiber is entangled and torn from the plant at the same time being twisted and drawn by the in-coming air into the vacuum tube.

In my invention, the air which is being drawn in is divided into two parts, one part passing into the tube with the cotton and the other part coming in contact with the propeller blades which are carried by the outside of the picking tube for rotating the same.

In my present invention these propeller blades are comparatively numerous and are arranged about the picking tube in the manner of a steam turbine, the air being admitted to the blades through a series of openings formed in the side of the casing preferably at an inclination so that the in-rushing air strikes the blades fairly and insures the powerful rotation of the tube.

My invention consists of the arrangement and combination of parts hereinafter described and claimed.

My invention may be readily understood by reference to the accompanying drawing in which is shown a nozzle constructed in accordance with my invention and designed to be used at the end of a length of pneumatic hose through which the air is drawn by a suitable fan.

Referring to the drawing.

Figure 1 is a half side view and a half longitudinal section through the nozzle.

Fig. 2 is an enlarged section on the line 1—1 of Fig. 1.

Fig. 3 is an enlarged section on the line 2—2 of Fig. 1.

Fig. 4 is a side elevation of the rotary picking tube and

Fig. 5 is a detail section taken on the line 3—3 of Fig. 3.

Referring to the drawing, 4 represents the lower or minor end of a tubular casing intended to be connected with a suitable rubber hose or tube. The upper end of the section 4 of the casing is expanded or enlarged into a screw threaded socket 6. The upper or outer section 8 of the casing has its lower end enlarged to form a screw threaded end 7 to fit the socket 6. There is thus formed in the center of the tubular casing an annular enlargement within which the propeller blades 9 of the rotary tube 10 are located. The tube 10 rests and rotates on a ball bearing joint formed at each end, the upper ball race 12 and the lower ball race 11 both being formed as annular projections on the tube 10. The opposing ball races 13 and 14 are formed on the casing, being offset inwardly from the body of the casing by spider arms 15 leaving an annular space 16 around the ball bearing through which the air passes after it leaves the propeller blades 9.

The air is admitted to the blades 9 through air ports 17 formed in the upper or outer member of the casing and these openings are formed at such angle that the air on entering strikes the blades fairly giving them the desired impetus to rotate the picking tube.

The tube 10 is somewhat smaller in diameter than the straight end of the casing 4 leaving a space between the two tubes through which the air which is drawn through the propeller blades joins the air which draws in the cotton and passes through the picking tube. The upper or outer end of the picking tube is provided with a series of picking pins which catch the fibers of cotton and twist them from their boll.

The upper and lower sections of the nozzle are thus connected by a screw thread connection so that one end may be unscrewed from the other.

When the section 8 is removed the picking tube may be slipped out without disturbing the ball bearings.

All the parts of the nozzle may thus be dismounted and inspected by simply unscrewing one joint and put together in the same manner.

I claim:

In a head for pneumatic cotton picking machines, the combination of a cylindrical casing consisting of a lower section having an annular enlargement at its upper end, an upper section having an annular enlargement at its lower end, the two sections being in screw threaded engagement and a rotary picking tube journaled within said casing and having fan blades lying within said annular enlargements, the upper enlargement having a series of relatively small openings for admitting the air to the tops of said blades for rotating the same.

In testimony whereof I hereby affix my signature.

GEORGE H. WATERHOUSE.